United States Patent
Zhang et al.

(10) Patent No.: US 11,133,752 B2
(45) Date of Patent: Sep. 28, 2021

(54) MODULAR MULTILEVEL CONVERTER WITH MULTI-PORT DC POWER FLOW CONTROL AND CONTROL METHOD THEREOF

(71) Applicant: SHANGHAI JIAO TONG UNIVERSITY, Shanghai (CN)

(72) Inventors: Jianwen Zhang, Shanghai (CN); Weixin Fang, Shanghai (CN); Jianqiao Zhou, Shanghai (CN); Gang Shi, Shanghai (CN); Han Wang, Shanghai (CN); Xu Cai, Shanghai (CN)

(73) Assignee: SHANGHAI JIAO TONG UNIVERSITY, Shanghai (CN)

(*) Notice: Subject to any disclaimer, the term of this patent is extended or adjusted under 35 U.S.C. 154(b) by 0 days.

(21) Appl. No.: 17/197,071

(22) Filed: Mar. 10, 2021

(65) Prior Publication Data

US 2021/0203247 A1  Jul. 1, 2021

Related U.S. Application Data

(63) Continuation of application No. PCT/CN2019/110679, filed on Oct. 11, 2019.

(30) Foreign Application Priority Data

Jul. 26, 2019 (CN) .......................... 201910679619.2

(51) Int. Cl.
*H02M 7/48* (2007.01)
*H02M 7/483* (2007.01)
(Continued)

(52) U.S. Cl.
CPC ............. *H02M 7/4835* (2021.05); *H02J 3/36* (2013.01); *H02M 1/0012* (2021.05); *H02M 7/483* (2013.01)

(58) Field of Classification Search
CPC .. H02M 7/483; H02M 7/4835; H02M 1/0012; H02J 3/36
See application file for complete search history.

(56) References Cited

U.S. PATENT DOCUMENTS 6,340,851 B1  1/2002  Rinaldi et al.
8,264,191 B1  9/2012  Ranganathan et al.
(Continued)

FOREIGN PATENT DOCUMENTS

CN   104184139 A   12/2014
CN   104377720 A    2/2015
(Continued)

OTHER PUBLICATIONS

Internation Search Report of PCT/CN2019/110679, dated Apr. 24, 2020.

*Primary Examiner* — Rafael O De Leon Domenech
(74) *Attorney, Agent, or Firm* — True Shepherd LLC; Andrew C. Cheng

(57) ABSTRACT

A modular multilevel converter with multi-port DC power flow control includes a modular multilevel converter topology and a DC power flow controller, wherein an input terminal of the DC power flow controller is connected in series to uppermost submodules of upper arms of the modular multilevel converter topology, and with power transfer and energy interaction between the modular multilevel converter topology and an AC power grid, a converter station or a solid state transformer based on the modular multilevel converter topology has a function of direct current power flow control. The output terminal of the DC power flow controller adopts DC/DC converters to regulate the output voltage, and a plurality of DC/DC converters share a common DC bus with the ports connected with different DC outlet lines, thereby providing a plurality of flexible and controllable DC ports.

12 Claims, 11 Drawing Sheets

(51) Int. Cl.
*H02J 3/36* (2006.01)
*H02M 1/00* (2006.01)

(56) References Cited

U.S. PATENT DOCUMENTS

| | | | |
|---|---|---|---|
| 9,065,377 B2 | 6/2015 | Xu et al. | |
| 10,069,430 B2* | 9/2018 | Sahoo | H02P 27/08 |
| 2016/0380556 A1* | 12/2016 | Peng | H02M 7/483 |
| | | | 363/71 |
| 2018/0069469 A1* | 3/2018 | Gupta | H02M 1/32 |
| 2018/0166877 A1* | 6/2018 | Depreville | H02H 9/02 |
| 2018/0287509 A1* | 10/2018 | Fujii | H02M 7/48 |
| 2019/0044427 A1* | 2/2019 | Fujii | H02M 7/797 |
| 2019/0199096 A1* | 6/2019 | Kish | H02M 3/155 |
| 2019/0267898 A1* | 8/2019 | Elserougi | H02M 7/4835 |
| 2021/0111629 A1* | 4/2021 | Gray | H02M 3/33584 |

FOREIGN PATENT DOCUMENTS

| | | |
|---|---|---|
| CN | 106953305 A | 7/2017 |
| CN | 107039980 A | 8/2017 |
| CN | 108718083 A | 10/2018 |
| CN | 109038687 A | 12/2018 |
| CN | 109194137 A | 1/2019 |

* cited by examiner

MODULAR MULTILEVEL CONVERTER WITH MULTI-PORT DC POWER FLOW CONTROL AND CONTROL METHOD THEREOF

CROSS-REFERENCE TO RELATED APPLICATIONS

This application is a continuation of International Patent Application No. PCT/CN2019/110679 with a filing date of Nov. 10, 2019, designating the United States, now pending, and further claims priority to Chinese Patent Application No. 201910679619.2 with a filing date of Jul. 26, 2019. The content of the aforementioned applications, including any intervening amendments thereto, are incorporated herein by reference.

TECHNICAL FIELD

This application relates to the technical fields of smart grid, power electronics, etc. of power systems, in particular to a modular multilevel converter with multi-port DC power flow control, and a control method thereof.

BACKGROUND OF THE PRESENT INVENTION

In recent years, renewable energy technologies and industries have rapidly developed, but the intermittency of new energy power generation has brought many challenges to the power system. In terms of large-scale new energy grid-connection, AC power grids are not conducive to the high-proportion access of new energy, and there is a need for new technologies, equipment and power grid structures to improve the utilization rate of renewable energy. The multi-terminal DC technology and DC power grid technology are one of the effective technical methods to resolve the issues in grid-connection and consumption of renewable energy.

In a multi-terminal DC system, the ring/mesh topology is superior to other types of topologies. Multi-terminal DC transmission is to construct a mesh DC power grid by interconnection of DC terminals of converters, and compared with conventional two-terminal DC transmission, it achieves multi-terminal power supply and multi-terminal power consumption, so that the system is more reliable, and also more economical and flexible as the interconnection of multiple power grids is achieved with lower construction and operation costs. For a multi-terminal DC distribution network, the mesh topology is excellent in flexibility and redundancy, and allows flexible assignment and management of distributed energy resources, so that massive acceptance, optimized configuration, and full use of different types of distributed energy resources can be achieved. Besides, in the case of a local failure, the impact on the distribution network is minimized with effective isolation and network reconstruction means. Therefore, the ring/mesh topology is advantageous in improving the operation reliability of the DC system, enabling mutual energy compensation and increasing the resource utilization efficiency. However, in a ring/mesh-type DC system, there may be multiple DC lines between controllable nodes such that the count of the lines is greater than the count of the controllable nodes −1, therefore, the power flow of the lines cannot be effectively regulated only by voltage and current control of the nodes.

With the development of power electronics and control technology, among the existing multi-terminal voltage source converter based high voltage DC systems, most of high-voltage DC transmission systems use voltage source converters (VSC) to construct converter stations, while medium-voltage DC distribution networks use voltage source converters (VSC) or solid state transformers (SST) with medium-voltage DC ports as the core. Due to the restriction of the power devices and series connection technology, the conventional two-level or three-level structures cannot meet the requirements of high and medium voltage levels, while the modular multilevel configuration has been widely studied and applied in the field of DC power transmission and distribution because of its modularized design, high output levels, expandable capacity and high voltage level, which provides the implementation and topology basis for converter stations and solid state transformers in DC systems.

SUMMARY OF PRESENT INVENTION

Based on the topology of converter stations or solid state transformers in existing multi-terminal DC systems and the technical requirements of DC power flow control, a DC power flow control function needs to be additionally provided in order to solve the issue of power flow control in the DC system, and the power flow of each line in the DC system is effectively controlled with an increased control freedom degree, thereby ensuring the stable operation of the DC system.

Without the reactive power, reactance and phase angle of the AC system, the DC system controls the DC power flow by adjusting the resistance and direct voltage of the line. In terms of controlling the resistance of the line, the DC power flow can be controlled with a variable resistor serially connected in the line. This method has a large loss and requires the device to have excellent heat dissipation, and the power flow can only be regulated in a single direction. In terms of controlling the DC voltage, one of the methods is to connect a DC/DC converter with a transformation ratio of about 1 to a DC system at the same voltage level, and regulate the power flow of the DC system by fine adjustment of the transformation ratio. However, in this case, all the power needs to pass through the DC/DC/DC converter, so that the cost and the loss are large. Another method is that an adjustable voltage source is serially connected in the line to change the direct voltage so as to control the DC power flow. This circuit configuration requires additional power source as well as high voltage isolation transformers for voltage isolation, and requires more switching devices. Yet another method is referred as an interline DC power flow controller, which eliminates the external power supply and is equivalent to an adjustable voltage source serially connected in the line by utilizing power exchange between lines, thereby achieving power flow control. However, in order to control energy balance in the device, the configuration and control of the device are complicated, and are limited by the transmission power of the line to some extent.

Aiming at the above problems, an object of the disclosure is to provide a modular multilevel converter with multi-port DC power flow control and a modulation method thereof to solve the power flow control issues in the DC system and ensuring the stable operation of the DC system.

In order to achieve the above object, the present disclosure adopts the following technical scheme.

According to a first aspect of the present disclosure, a modular multilevel converter with multi-port DC power flow control is provided, including: a modular multilevel converter topology composed of a plurality of upper and lower arms of identical configuration, each arm being formed by a plurality of cascaded submodules, and a DC power flow controller, wherein the input terminal of the DC power flow controller is connected in series to uppermost submodules of the upper arms of the modular multilevel converter topology, and with power transfer and energy interaction between the modular multilevel converter topology and an AC power grid, a converter station or a solid state transformer based on the modular multilevel converter topology has a function of DC power flow control.

Preferably, the DC power flow controller comprises an input terminal, a capacitor and an output terminal, wherein the capacitor is connected in parallel between the input terminal and the output terminal, and energy transfer between the input terminal and the output terminal is buffered by the capacitor.

Preferably, the input terminal of the DC power flow controller takes a single-phase half bridge or three-phase half bridge structure.

Preferably, three-phase input terminal of the DC power flow controller is connected in series to uppermost submodules of three-phase upper arms of the modular multilevel converter topology.

Preferably, the capacitor is connected in parallel with the single-phase half bridge or three-phase half bridge structure, and the single-phase half bridge or three-phase half bridge structure enables the capacitor to be charged, discharged or bypassed by controlling the on/off of the upper and lower arms of the single-phase half bridge or three-phase half bridge structure, and as the DC power flow controller has no other energy storage device but the capacitor, the state of the single-phase half bridge or three-phase half bridge structure is controlled to keep balance of the capacitor voltage, i.e., energy balance between the input terminal and the output terminal of the DC power flow controller.

Preferably, the output terminal of the DC power flow controller adopts DC/DC converters to regulate the output voltage, and a plurality of DC/DC converters are connected in parallel to form a plurality of flexible and controllable DC ports, so that the output voltage or output power can be flexibly adjusted. Further, the output terminal of the DC power flow controller has a plurality of DC ports such that a converter station or a solid state transformer based on the modular multilevel converter topology provides a plurality of flexible and controllable DC ports, thereby allowing to construct a mesh/ring-type multi-terminal voltage source converter based DC transmission system based on a plurality of converter stations or mesh/ring-type multi-terminal voltage source converter based DC transmission system based on a plurality of solid state transformers.

According to a second aspect of the disclosure, a method for modulating the modular multilevel converter with multi-port DC power flow control as described above is provided, a carrier phase shift modulation strategy is adopted for the DC power flow controller and the modular multilevel converter topology, and the input terminal of the DC power flow controller and the submodules of the modular multilevel topology are provided with individual modulation strategies.

Specifically, the method includes:
ignoring modification of the DC power flow controller and circulating current control of the arms of the modular multilevel converter topology and other balance control to a voltage reference of the arms, the following formulas are obtained:

$$\begin{cases} u_{ap0} = x_1 \dfrac{U_d}{2} - y_1 u_{aref} \\ u_{ap} = x_2 \dfrac{U_d}{2} - y_2 u_{aref} \\ u_{an} = \dfrac{U_d}{2} + u_{aref} \end{cases}$$

where $x_1$, $y_1$ are the DC component coefficient and fundamental frequency AC component coefficient of the single-phase half bridge voltage reference of the DC power flow controller, respectively, $x_2$, $y_2$ are the DC component coefficient and fundamental frequency AC component coefficient of the upper arm voltage reference of the modular multilevel converter topology, respectively, $u_{ap0}$ is the AC side output voltage reference of the single-phase half bridge, $u_{ap}$, $u_{an}$ are output voltage references of the upper and lower arms of the modular multilevel converter topology, respectively, $u_{aref}$ is the AC side output voltage reference of the modular multilevel converter topology, $u_{aref}=U\sin(\omega t)$, U is the amplitude of phase voltage of AC grid, $\omega$ signifies grid voltage angular frequency, t signifies time and $U_d$ is the DC bus voltage of the DC power flow controller;

obviously, the reference coefficients satisfy:

$$\begin{cases} x_1 + x_2 = 1 \\ y_1 + y_2 = 1 \\ x_1, x_2 > 0 \\ y_1, y_2 > 0 \end{cases}$$

$U_{c0}$ is the DC component of the DC power flow controller capacitor voltage, $U_{c1}$ is the DC component of the submodule capacitor voltage of the modular multilevel converter topology, and n is the count of the submodules of each arm of the modular multilevel converter topology, so that average switching functions of the single-phase half bridge of the DC power flow controller and the submodules of the upper and lower arms of the modular multilevel converter topology are obtained as follows:

$$\begin{cases} F_{ap0}(t) = x_1 \dfrac{U_d}{2U_{c0}}(1 - m_1 \sin(\omega t)) \\ F_{ap}(t) = x_2 \dfrac{U_d}{2nU_{c1}}(1 - m_2 \sin(\omega t)) \\ F_{an}(t) = \dfrac{U_d}{2nU_{c1}}(1 + m\sin(\omega t)) \end{cases}$$

where $m_1$, $m_2$, m are voltage modulation coefficients of the single-phase half bridge of the DC power flow controller and the submodules of the upper and lower arms of the modular multilevel converter topology, respectively:

$$m_1 = \dfrac{y_1 U}{x_1 \dfrac{U_d}{2}}$$

$$m_2 = \dfrac{y_1 U}{x_1 \dfrac{U_d}{2}}$$

$$m = \dfrac{U}{\dfrac{U_d}{2}}$$

where U is the amplitude of the AC side phase voltage;

for a DC power flow controller with an input terminal of three-phase half bridge structure, the sum of input side current at upper and lower terminals of the capacitor is the sum of DC components of the three-phase arms current of the modular multilevel converter topology, and assuming that the sum of the DC components of three-phase arms current of the modular multilevel converter topology embedded with the DC power flow controller is $I_d$, then $$I_d = i_{SMp0-} + i_{SMp0+}$$

where $i_{SMp0-}$ is the input side current at the lower terminal of the capacitor of the DC power flow controller; $i_{SMp0+}$ is the input side current at the upper terminal of the capacitor of the DC power flow controller;

then, the currents of the upper and lower arms of the modular multilevel converter topology are as follows:

$$i_{ap}(t) = -\frac{1}{3}I_d - \frac{1}{2}i_a(t) = -\frac{1}{3}I_d - \frac{1}{2}I\sin(\omega t - \varphi)$$

$$i_{an}(t) = -\frac{1}{3}I_d + \frac{1}{2}i_a(t) = -\frac{1}{3}I_d + \frac{1}{2}I\sin(\omega t - \varphi)$$

where $i_a$ is the A-phase AC current; $\varphi$ is the power factor angle; $\omega$ is the AC voltage frequency; t is time; I denotes the amplitude of phase current of AC grid; $i_{ap}(t)$ and $i_{an}(t)$ are A-phase upper and lower arms current of the modular multilevel converter topology, respectively;

the input side currents of the capacitor of the DC power flow controller are determined by multiplying the arm current of each phase and the switching function of the single-phase half bridge and then merging the three phases:

$$i_{SMp0-}(t) = \sum_{k=a,b,c} F_{kp0}(t) \cdot (-i_{kp}(t)) = -x_1 \frac{3U_d I}{8U_{c0}} m_1 \cos\varphi + x_1 \frac{U_d I_d}{2U_{c0}} i_{SMp0+}(t) =$$

$$\sum_{k=a,b,c} (1 - F_{kp0}(t))(-i_{kp}(t)) = I_d + x_1 \frac{3U_d I}{8U_{c0}} m_1 \cos\varphi - x_1 \frac{U_d I_d}{2U_{c0}}$$

where $F_{kp0}(t)$ is the average switching function of the single-phase half bridge of the DC power flow controller; $i_{kp}(t)$ is single-phase upper and lower arms current of the modular multilevel converter topology; and a, b and c are the three phases;

for a DC power flow controller with an input terminal of single-phase half bridge structure, the input side currents of the capacitor include a DC component as well as a low-frequency AC component, and assuming that the DC component of the single-phase arm current of the modular multilevel converter topology embedded with the DC power flow controller is $I_d$, then the upper arm current and the lower arm current of the modular multilevel converter are set as:

$$i_{ap}(t) = -I_d - \frac{1}{2}i_a(t) = -I_d - \frac{1}{2}I\sin(\omega t - \varphi)$$

$$i_{an}(t) = -I_d + \frac{1}{2}i_a(t) = -I_d + \frac{1}{2}I\sin(\omega t - \varphi)$$

the input side currents of the capacitor of the DC power flow controller are determined by multiplying the arm current of that phase and the switching function of the single-phase half bridge:

$$i_{SMp0-}(t) = F_{ap0}(t) \cdot (-i_{ap}(t)) = \frac{x_1 U_d I_d}{2U_{c0}}(1 - m_1 \sin(\omega t)) +$$

$$\frac{x_1 U_d I}{4U_{c0}}\left(\sin(\omega t - \varphi) - \frac{1}{2}m_1(\cos\varphi - \cos(2\omega t - \varphi))\right)$$

$$i_{SMp0+}(t) = (1 - F_{ap0}(t))(-i_{ap}(t)) ==$$

$$I_d + \frac{1}{2}I\sin(\omega t - \varphi) - \frac{x_1 U_d I_d}{2U_{c0}}(1 - m_1 \sin(\omega t)) -$$

$$\frac{x_1 U_d I}{4U_{c0}}\left(\sin(\omega t - \varphi) - \frac{1}{2}m_1(\cos\varphi - \cos(2\omega t - \varphi))\right)$$

an input and output power balance equation of the DC power flow controller is as follows:

$$P_{PFC} = U_d i_{SMp0+} + (U_d - U_{c0})i_{SMp0-} = P_{MVDC}$$

where $P_{PFC}$ is the input active power of the DC power flow controller; $P_{MVDC}$ is the output active power of the medium-voltage DC side;

based on calculation and analysis, with appropriately selected DC component coefficients and fundamental frequency AC component coefficients of voltage reference, the voltage modulation coefficients of the single-phase half bridge of the DC power flow controller and the upper and lower arms of the modular multilevel converter topology are enabled to meet the energy balance of the DC power flow controller.

Preferably, an open-loop control strategy is adopted for output DC ports of the DC power flow controller, and the following formulas are given $$\begin{cases} P_i = V_{oi} \cdot I_i \\ V_{oi} = I_i \cdot R_i + V_i \end{cases}$$

$$i = 1, 2, \ldots n$$

Where $I_i$ signifies the average current of the DC line connected to the i DC port, $V_i$ signifies the average output voltage of the i DC port, $R_i$ signifies the resistance of the DC line connected to the i DC port.

according to the output power reference $P_i$ of each DC port, the output voltage reference $V_{oi}$ of each DC port can be calculated, then, according to the specific topology of the output DC/DC converter, a relationship between the output voltage reference $V_{oi}$ and the duty ratio $D_i$ of the DC/DC converter is obtained, and in turn a relationship between the output voltages difference $\Delta V_{ij}$ and the duty ratios difference $\Delta D_{ij}$ is obtained:

$$V_{oi} = f(U_d, U_{c0}, D_i) \quad i = 1, 2, \ldots n$$

$$\Delta V_{ij} = f(U_{c0}, \Delta D_{ij}) \quad i, j = 1, 2, \ldots n, \ i \neq j$$

according to the features of the specific topology of the DC/DC converter, when the duty ratio of the converter of a certain DC port is selected, the duty ratios of all the DC ports are determined, and the transfer power reference value of the DC ports are satisfied through carrier phase shift modulation.

According to a third aspect of the present disclosure, there is provided a converter station including a modular multi-level converter with multi-port DC power flow control as described above.

According to a fourth aspect of the present disclosure, there is provided a solid state transformer including a modular multilevel converter with multi-port DC power flow control as described above.

According to a fifth aspect of the present disclosure, there is provided a mesh/ring-type multi-terminal voltage source converter based DC transmission system based on a plurality of converter stations, including the plurality of converter stations including the modular multilevel converter with multi-port DC power flow control as described above.

According to a sixth aspect of the present disclosure, there is provided a mesh/ring-type multi-terminal voltage source converter based DC distribution system based on a plurality of solid state transformers, including the plurality of solid state transformers including the modular multilevel converter with multi-port DC power flow control as described above.

Compared with existing topologies, the disclosure has the following beneficial effects:

1. The existing power electronic converter or transformer topology based on the modular multilevel structure (MMC) does not have a DC power flow control function. In the present disclosure, in order to solve the power flow control issue in the DC system, a plurality of controllable DC ports are formed by introducing a DC power flow controller, so that the control freedom degree of the DC power flow is increased, the effect of controlling power flow of multiple lines is achieved, and mesh/ring-type DC power transmission and distribution systems can be realized. Furthermore, while the function of power flow control is additionally provided, the power flow of each line in the DC system is effectively controlled with an increased control freedom degree, thereby ensuring the stable operation of the DC system.

2. Compared with the prior art, the modular multilevel converter with multi-port DC power flow control has fewer switching devices and lower loss; a low-frequency isolation transformer and an external power supply are not needed; the power can flow in dual direction, and the regulation range of power flow is wide; multi-port extension can be easily and flexibly achieved.

3. The modular multilevel converter with multi-port DC power flow control can be used for a mesh/ring-type multi-terminal DC transmission system based on the modular multilevel topology converter and a mesh/ring-type multi-terminal DC distribution system based on the solid state transformer, and the effect of flexible power flow control of multiple DC lines can be achieved with the multi-port DC power flow control function, providing an equipment basis for the network DC system.

DESCRIPTION OF THE DRAWINGS

Other features, objects, and advantages of the disclosure will become apparent from the following detailed description of non-limiting embodiments in connection with the accompanying drawings, in which.

DETAILED DESCRIPTION OF PREFERRED EMBODIMENTS

The present disclosure will now be described in detail with reference to specific embodiments. The following embodiments will aid those skilled in the art in further understanding the disclosure, but are not intended to limit the disclosure in any way. It should be noted that several variations and modifications may be made by those skilled in the art without departing from the inventive concept. All these are within the scope of the disclosure.

Figure 1A:
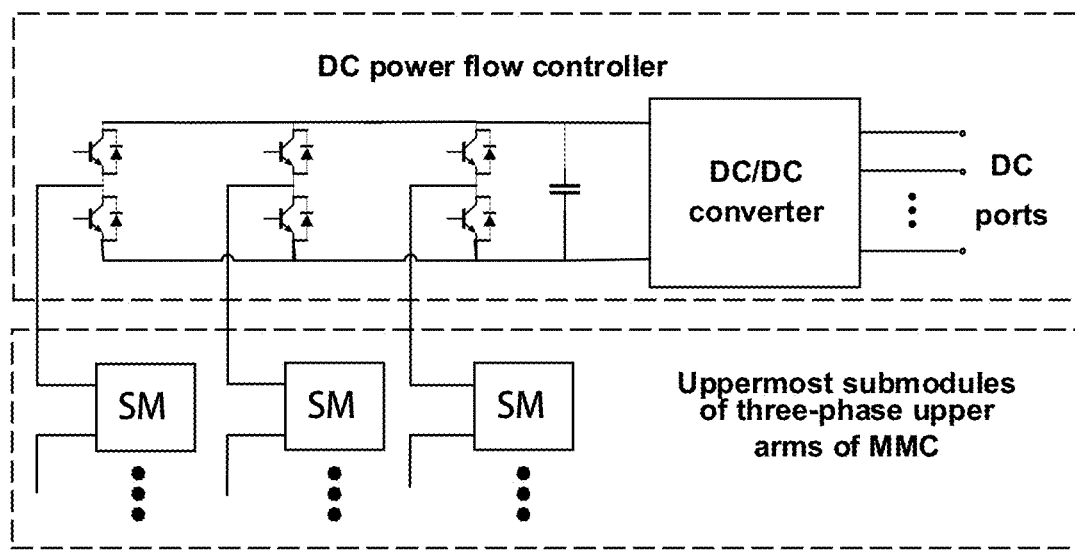
FIGS. 1a and 1b are schematic diagrams showing the topology and the combination mode with the modular multilevel topology according to an embodiment of the disclosure.
Figure 1B:
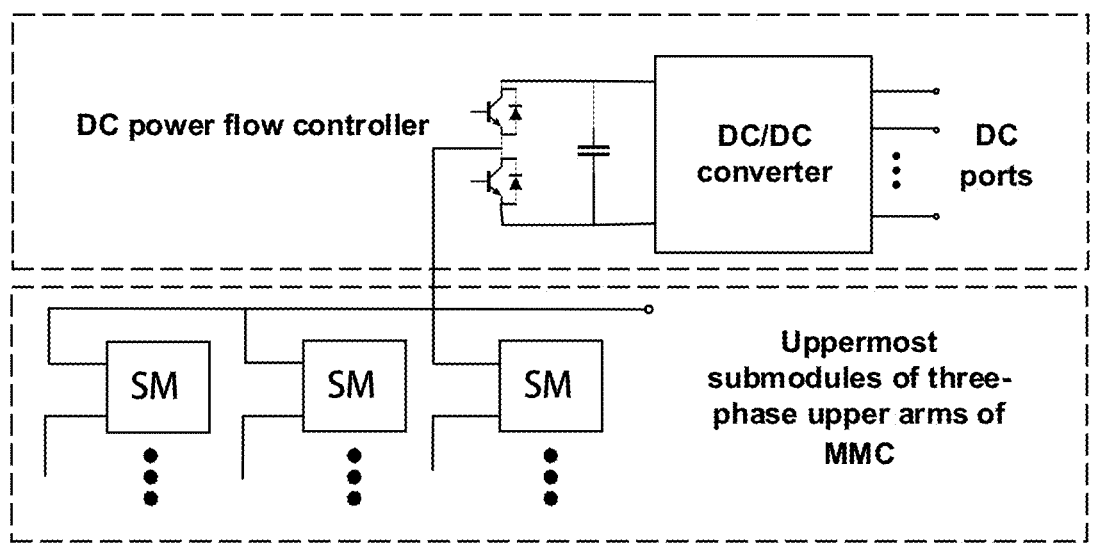

Referring to FIGS. 1a and 1b, the topology of a modular multilevel converter with multi-port DC power flow control according to an embodiment of the present disclosure is shown, the topology includes: a modular multilevel converter (MMC) topology composed of a plurality of upper and lower arms of identical configuration, each arm being formed by a plurality of cascaded submodules, and a DC power flow controller, wherein an input terminal of the DC power flow controller is connected in series to uppermost submodules of upper arms of the modular multilevel converter (MMC) topology, and with power transfer and energy interaction between the modular multi-level converter topology and an AC power grid, a converter station or a solid state transformer based on the modular multilevel converter topology has a function of DC power flow control. The modular multilevel converter (MMC) topology according to the embodiment of the present disclosure may be any of the prior art modular multilevel converter stations (MMC).

As shown in FIGS. 1a and 1b, the DC power flow controller includes an input terminal, a capacitor and an output terminal, wherein the capacitor is connected in parallel between the input and the output terminals, and energy transfer between the input and the output terminals is realized by the capacitor. In a specific embodiment, the input terminal of the DC power flow controller may take a single-phase half bridge (FIG. 1b) or three-phase bridge (FIG. 1a) structure. The output terminal may adopt DC/DC converters, and a plurality of DC/DC converters may be connected in parallel to provide a plurality of flexible and controllable DC ports, so that the output voltage or output power can be flexibly adjusted.

In the embodiment described above, the DC power flow controller has a plurality of output ports (DC ports), so that an MMC converter station or an MMC solid state transformer device can provide a plurality of flexible and controllable DC ports, thereby allowing to construct a mesh/ring-type multi-terminal voltage source converter based DC transmission system based on a plurality of converter stations or mesh/ring-type multi-terminal voltage source converter based high voltage DC system based on a plurality of solid state transformers.

In the embodiment described above, the capacitor is connected in parallel with the single-phase half bridge or three-phase half bridge structure, and the input terminal of the DC power flow controller controls the on/off of the upper and lower arms of the single-phase half bridge or three-phase bridge structure to charge, discharge or bypass the capacitor; and as the DC power flow controller has no other energy storage device but the intermediate capacitor, the on/off of the single-phase half bridge or three-phase half bridge structure is controlled to keep balance of the capacitor voltage, i.e., energy balance between the input and output of the DC power flow controller.

For the aforementioned modular multilevel converter with multi-port DC power flow control, a modulation method for the modular multilevel converter with multi-port DC power flow control is described below. In general, a carrier phase shift modulation strategy is adopted for the DC power flow controller and the modular multilevel converter topology of the modular multilevel converter with multi-port DC power flow control.

Figure 2:
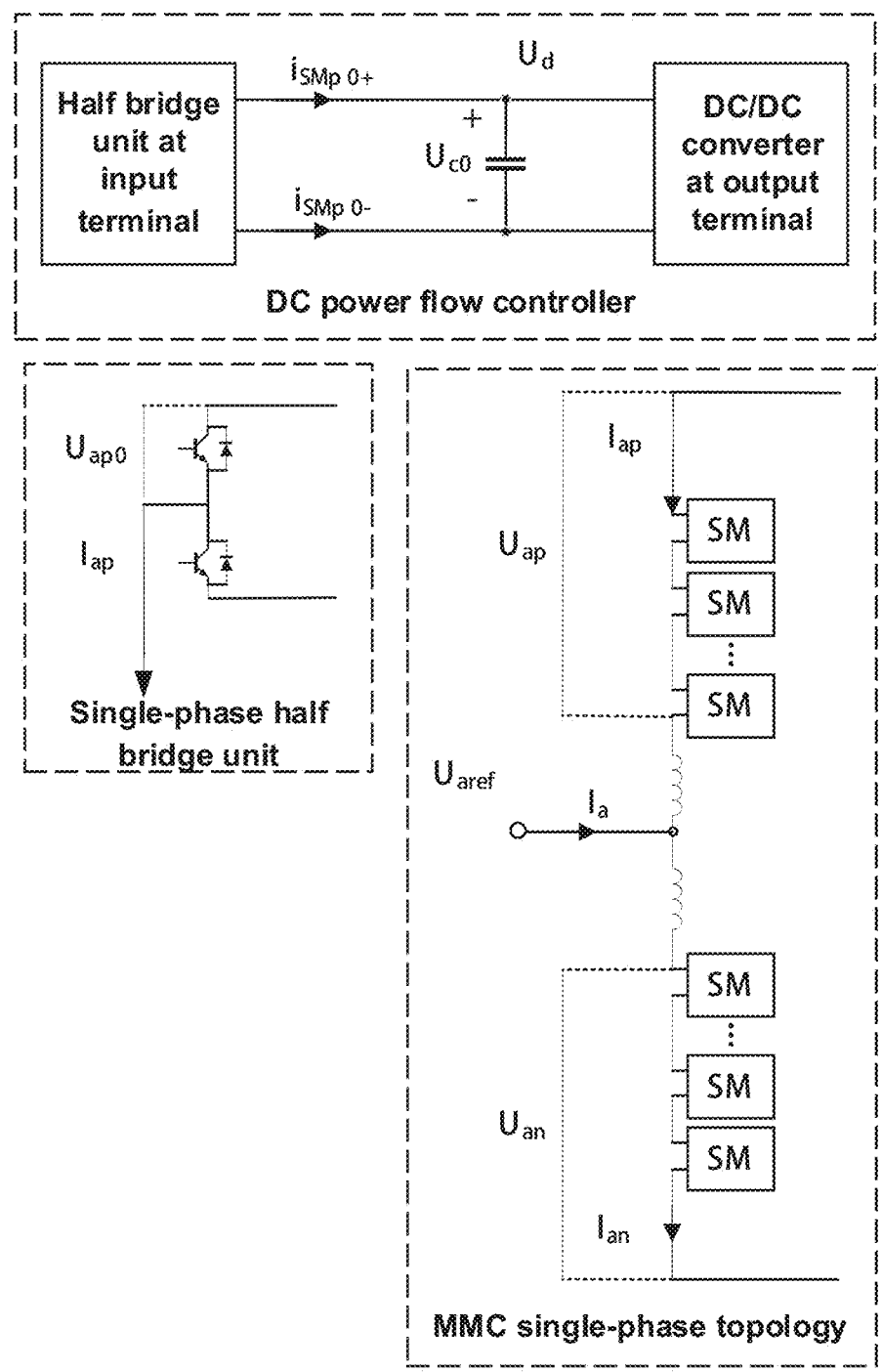
FIG. 2 is a schematic diagram illustrating parameters of a modulation strategy according to an embodiment of the present disclosure.

Specifically, the single-phase half bridge of the input of the DC power flow controller and the submodules of the modular multilevel topology (MMC) are provided individual modulation strategies. Taking a-phase as an example (the other two phases are similar), a schematic diagram illustrating parameters of the modulation strategy is shown in FIG. 2, and with ignoring modification of circulating current control of the arms and other balance control to the voltage reference of the arms, the following formulas are obtained:

$$\begin{cases} u_{ap0} = x_1 \frac{u_d}{2} - y_1 u_{aref} \\ u_{ap} = x_2 \frac{u_d}{2} - y_2 u_{aref} \\ u_{an} = \frac{u_d}{2} + u_{aref} \end{cases}$$

where, $x_1$, $y_1$ are the DC component coefficient and a fundamental frequency AC component coefficient of the single-phase half bridge voltage reference of the DC power flow controller, respectively, $x_2$, $y_2$ are the DC component coefficient and fundamental frequency AC component coefficient of the upper arms voltage reference of the MMC, $u_{ap0}$ is the AC side output voltage reference of the single-phase half bridge, $u_{ap}$, $u_{an}$ are output voltage references of the upper and lower arms of the MMC, respectively, and $u_{aref}$ is the AC side voltage reference of the MMC, $U_{aref}=U\sin(\omega t)$, U is the amplitude of phase voltage of AC grid, $\omega$ signifies grid voltage angular frequency, t signifies time, $U_d$ is the DC bus voltage of the DC power flow controller, and obviously, the reference coefficients satisfy:

$$\begin{cases} x_1 + x_2 = 1 \\ y_1 + y_2 = 1 \\ x_1, x_2 > 0 \\ y_1, y_2 > 0 \end{cases}$$

where $U_{c0}$ is the DC component of the DC power flow controller capacitor voltage, $U_{c1}$ is the DC component of the submodule capacitor voltage of the MMC, n is the count of the submodules of each arm of the modular multilevel converter topology, so that averaged switching functions of the single-phase half bridge of the DC power flow controller and the submodules of the upper and lower arms of the MMC are obtained as follows:

$$\begin{cases} F_{ap0}(t) = x_1 \frac{U_d}{2U_{c0}} (1 - m_1 \sin(\omega t)) \\ F_{ap}(t) = x_2 \frac{U_d}{2nU_{c1}} (1 - m_2 \sin(\omega t)) \\ F_{an}(t) = \frac{U_d}{2nU_{c1}} (1 + m \sin(\omega t)) \end{cases}$$

where $m_1$, $m_2$, m are voltage modulation coefficients of the single-phase half bridge of the DC power flow controller and the submodules of the upper and lower arms of the MMC, respectively:

$$m_1 = \frac{y_1 U}{x_1 \frac{u_d}{2}}$$

$$m_2 = \frac{y_1 U}{x_1 \frac{u_d}{2}}$$

$$m = \frac{U}{\frac{u_d}{2}}$$

For a DC power flow controller with an input of three-phase half bridge structure, the sum of input side currents at upper and lower terminals of the capacitor is the sum of DC components of the three-phase arms current of the MMC, therefore, assuming that $$I_d = i_{SMp0-} + i_{SMp0+}$$

where $i_{SMp0-}$ is the input side current at the lower terminal of the capacitor of the DC power flow controller; $i_{SMp0+}$ is the input side current at the upper terminal of the capacitor of the DC power flow controller;

then the currents of the upper and lower arms of the MMC are as follows:

$$i_{ap}(t) = -\frac{1}{3}I_d - \frac{1}{2}i_a(t) = -\frac{1}{3}I_d - \frac{1}{2}I\sin(\omega t - \varphi)$$

$$i_{an}(t) = -\frac{1}{3}I_d + \frac{1}{2}i_a(t) = -\frac{1}{3}I_d + \frac{1}{2}I\sin(\omega t - \varphi)$$

where $i_a$ is the a-phase AC current; $\varphi$ is the power factor angle; I denotes the amplitude of phase current of AC grid; $i_{ap}(t)$ and $i_{an}(t)$ are a-phase upper and lower arms current of the modular multilevel converter topology, respectively;

The input side currents of the capacitor of the DC power flow controller are determined by multiplying the arm current of each phase by the switching function of the single-phase half bridge and then merging the three phases:

$$i_{SMp0-}(t) = \sum_{k=a,b,c} F_{kp0}(t) \cdot (-i_{kp}(t)) = -x_1 \frac{3U_d I}{8U_{c0}} m_1 \cos\varphi + x_1 \frac{U_d I_d}{2U_{c0}}$$

$$i_{SMp0+}(t) = \sum_{k=a,b,c} (1 - F_{kp0}(t))(-i_{kp}(t)) = I_d + x_1 \frac{3U_d I}{8U_{c0}} m_1 \cos\varphi - x_1 \frac{U_d I_d}{2U_{c0}}$$

where $F_{kp0}(t)$ is the average switching function of the single-phase half bridge of the DC power flow controller; $i_{kp}(t)$ is single-phase upper and lower arms current of the modular multilevel converter topology; and a, b and c are the three phases;

For a DC power flow controller with an input of single-phase half bridge structure, the input side currents of the capacitor include a DC component as well as a low-frequency AC component, and assuming that the DC component of the single-phase arm current of the MMC connected to the DC power flow controller is $I_d$, then an upper arm current and a lower arm current of the MMC can be set as:

$$i_{ap}(t) = -I_d - \frac{1}{2}i_a(t) = -I_d - \frac{1}{2}I\sin(\omega t - \varphi)$$

$$i_{an}(t) = -I_d + \frac{1}{2}i_a(t) = -I_d + \frac{1}{2}I\sin(\omega t - \varphi)$$

The input side currents of the capacitor of the DC power flow controller are determined by multiplying the arm current of this phase by the switching function of the single-phase half bridge:

$$i_{SMp0-}(t) = F_{ap0}(t) \cdot (-i_{ap}(t)) = \frac{x_1 U_d I_d}{2U_{c0}}(1 - m_1\sin(\omega t)) +$$

$$\frac{x_1 U_d I}{4U_{c0}}\left(\sin(\omega t - \varphi) - \frac{1}{2}m_1(\cos\varphi - \cos(2\omega t - \varphi))\right)$$

$$i_{SMp0+}(t) = (1 - F_{ap0}(t))(-i_{ap}(t)) ==$$

$$I_d + \frac{1}{2}I\sin(\omega t - \varphi) - \frac{x_1 U_d I_d}{2U_{c0}}(1 - m_1\sin(\omega t)) -$$

$$\frac{x_1 U_d I}{4U_{c0}}\left(\sin(\omega t - \varphi) - \frac{1}{2}m_1(\cos\varphi - \cos(2\omega t - \varphi))\right)$$

An input and output power balance equation of the DC power flow controller is as follows:

$$P_I = U_d i_{SMp0+} + (U_d - U_{c0})i_{SMp0-} = P_O$$

where $P_I$ is the input active power of the DC power flow controller; $P_O$ is the output active power of the medium-voltage DC side; Based on calculation and analysis, with appropriately selected DC component coefficients and fundamental frequency AC component coefficients of voltage reference, the voltage modulation coefficients of the single-phase half bridge of the DC power flow controller and the upper and lower arms of the MMC are enabled to meet the energy balance of the DC power flow controller.

In a specific embodiment, by applying the carrier phase-shift modulation strategy to the DC power flow controller and the modular multilevel topology (MMC), the power balance problem of a converter station or a solid state transformer based on the modular multilevel topology incorporating the DC power flow controller is solved, thereby enabling the steady-state operation of the device.

Figure 3:
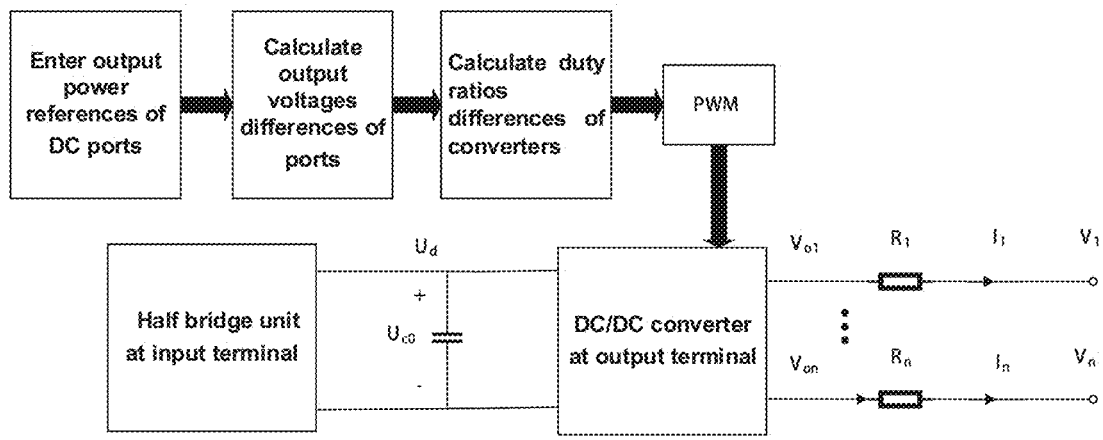
FIG. 3 is a block diagram illustrating a control strategy according to an embodiment of the present disclosure.

As shown in FIG. 3, a block diagram showing an open-loop control strategy for output DC ports of the DC power flow controller is shown, and the following formulas are given $$\begin{cases} P_i = V_{oi} \cdot I_i \\ V_{oi} = I_i \cdot R_i + V_i \end{cases} i = 1, 2, \ldots n$$

Where $I_i$ signifies the average current of the DC line connected to the i DC port, $V_i$ signifies the average output voltage of the i DC port, $R_i$ signifies the resistance of the DC line connected to the i DC port.

According to an output power reference $P_i$ of each DC port, an output voltage reference $V_{oi}$ of each DC port can be calculated. Then, according to the specifically selected topology of the output DC/DC converter, the relationship between the output voltage reference $V_{oi}$ and the duty ratio $D_i$ of the DC/DC converter is obtained, and in turn a relationship between the output voltages difference $\Delta V_{ij}$ and the duty ratios difference $\Delta D_{ij}$ is obtained:

$$V_{oi} = f(U_d, U_{c0}, D_i) \; i=1,2,\ldots n$$

$$\Delta V_{ij} = f(U_{c0}, \Delta D_{ij}) \; i,j=1,2,\ldots n, \; i \neq j$$

According to the features of the specific topology of the DC/DC converter, when the duty ratio of the converter of a certain DC port is selected, the duty ratios of all the DC ports are determined, and the transfer power reference value of the DC ports are satisfied through carrier phase shift modulation.

According to the embodiment of the disclosure, the multi-port DC power flow controller is connected to the MMC topology by serially connecting the input to the uppermost submodules of the upper arms or the lowermost submodules of the lower arms of the MMC, and the input may take a single-phase half bridge or three-phase bridge structure, and energy transfer between the input and the output is buffered by the capacitor; the output adopts non-isolated DC/DC converters to regulate the output voltage, and a plurality of DC/DC converters share a common DC bus, and the ports are connected to different DC outlet lines, thereby providing a plurality of flexible and controllable DC ports.

Figure 18:
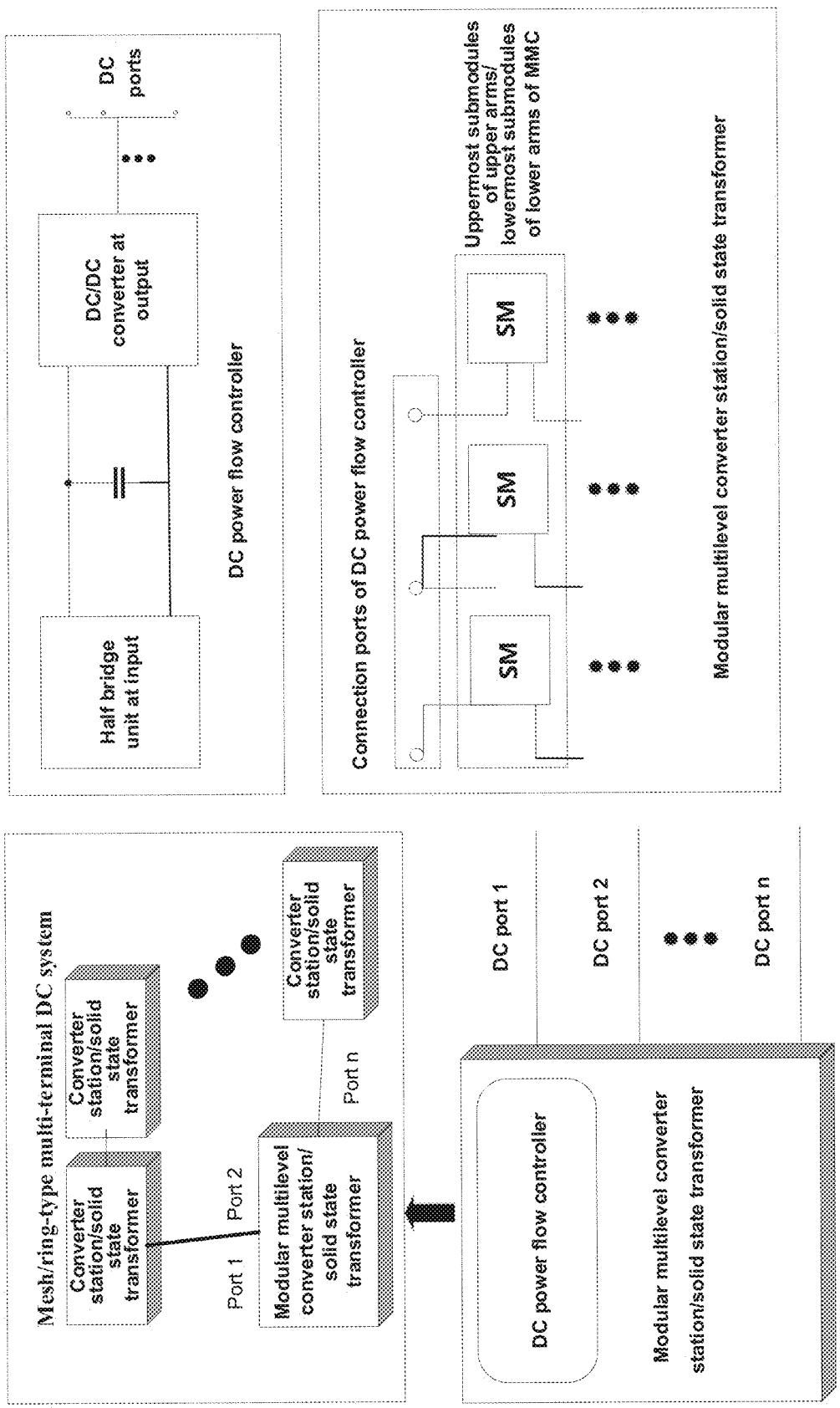
FIG. 18 is a schematic diagram illustrating the topology and its application in a ring/mesh-type multi-terminal DC system according an embodiment of the present disclosure.

Referring to FIG. 18, the topology of the embodiment of the disclosure can be used for a mesh or ring-type multi-terminal voltage source converter based DC power transmission and distribution system based on the modular multilevel topology converter and a mesh or ring-type multi-terminal voltage source converter based DC power distribution system based on a solid state transformer, and the effect of flexibly controlling the power flow of multiple DC lines can be achieved with the multi-port control of the DC power flow, providing an equipment basis for the network DC system. For a better understanding of the above-described embodiments of the present disclosure, specific applications are described below.

Embodiment 1

This embodiment is a ring/mesh-type DC transmission system based on the modular multilevel converter with multi-port DC power flow control described above, and is specifically implemented as follows.

Figure 4:
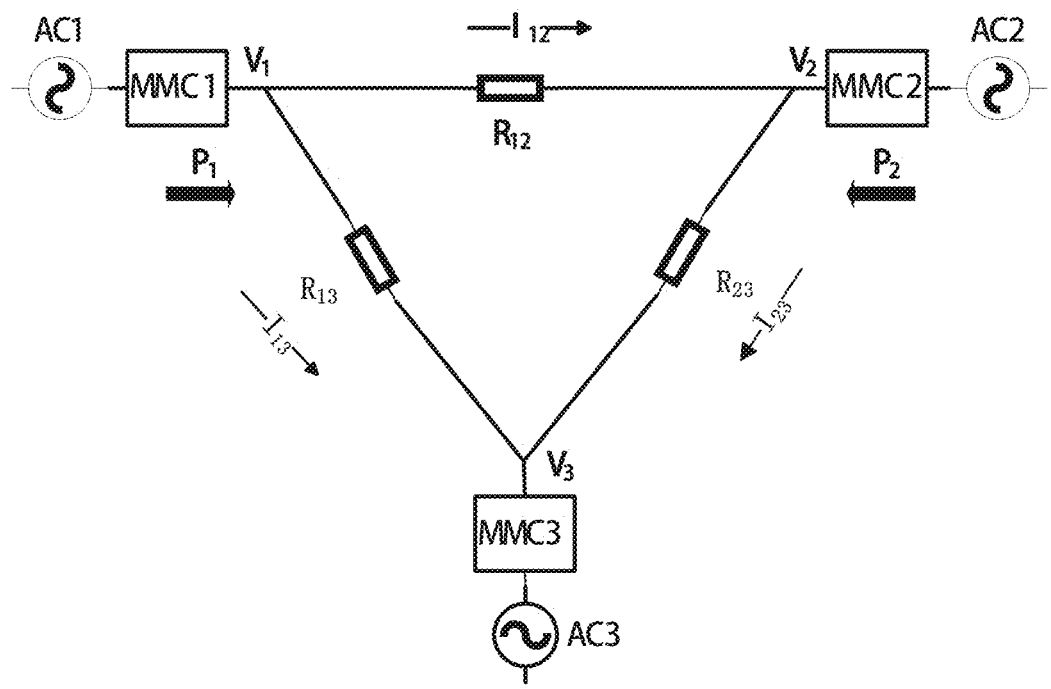
FIG. 4 shows an example of a conventional ring/mesh-type three-terminal high-voltage DC transmission system.

As shown in FIG. 4, an example of a conventional ring/mesh-type three-terminal high-voltage DC transmission system is shown. Assuming that a master-slave control mode is adopted, MMC station 1 and MMC station 2 operate in a constant power mode, power $P_1=200$ MW, $P_2=80$ MW are injected into the system. MMC station 3 operates in a constant voltage mode with a control voltage $V_3$ of 150 kV, and the power is transferred from the MMC 1 and the MMC 2 to the MMC 3.

Figure 5:
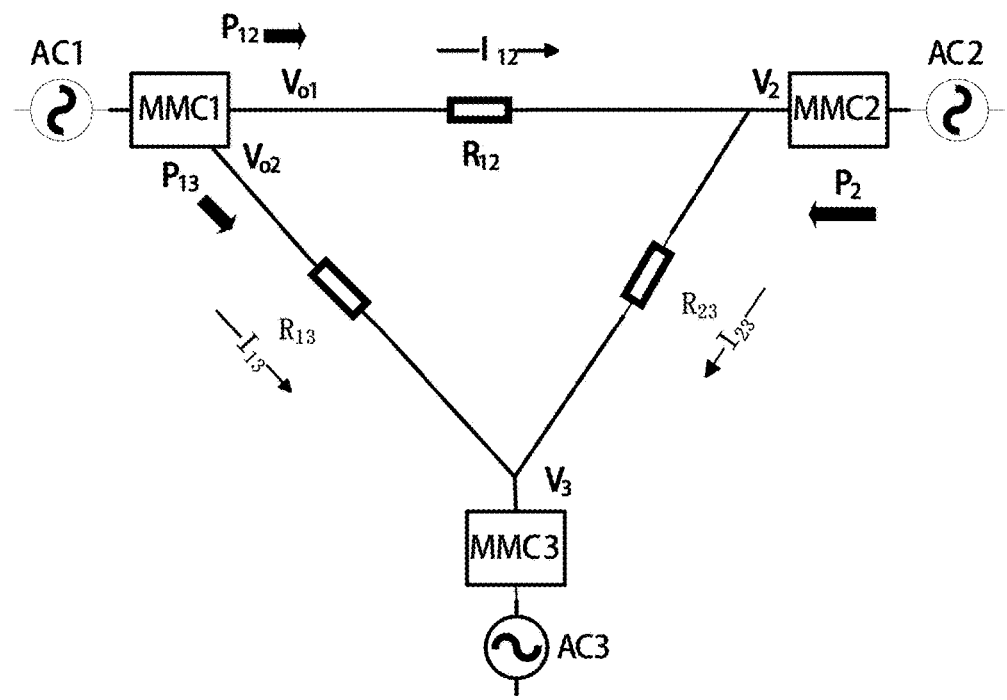
FIG. 5 shows an example of a ring/mesh-type three-terminal high-voltage DC transmission system including multi-port DC power flow control of the present disclosure.

As shown in FIG. 5, an example of the ring/mesh-type three-terminal high-voltage DC transmission system based on the modular multilevel converter with multi-port DC power flow control of the present disclosure described above is illustrated. The MMC station 1 is enabled to independently control transmission powers $P_{12}$ and $P_{13}$ of lines $L_{12}$ and $L_{13}$ by incorporating the DC power flow controller, and other operation conditions remain unchanged. Parameters of the lines are shown in the following table.

| DC line | Distance/km | Resistance/Ω |
|---|---|---|
| $L_{12}$ | 400 | 4 |
| $L_{13}$ | 500 | 5 |
| $L_{23}$ | 200 | 2 |

From FIG. 5, it has $$\begin{cases} I_{12} = \dfrac{V_{o1} - V_2}{R_{12}} \\ I_{13} = \dfrac{V_{o2} - V_3}{R_{13}} \\ I_{23} = \dfrac{V_2 - V_3}{R_{23}} \end{cases}$$

$$\begin{cases} P_1 = P_{12} + P_{13} \\ P_2 = V_2^2 \left( \dfrac{1}{R_{12}} + \dfrac{1}{R_{23}} \right) - V_2 \left( \dfrac{V_{o1}}{R_{12}} + \dfrac{V_3}{R_{23}} \right) \end{cases}$$

$$\begin{cases} P_{12} = \dfrac{V_{o1}(V_{o1} - V_2)}{R_{12}} \\ P_{13} = \dfrac{V_{o2}(V_{o2} - V_3)}{R_{12}} \\ P_{23} = \dfrac{V_2(V_2 - V_3)}{R_{23}} \end{cases}$$

where $V_{o1}$ and $V_{o2}$ are voltages of two medium-voltage DC ports of the MMC station 1, and $R_{12}$, $R_{13}$, $R_{23}$ are resistances of lines between the three MMC stations; $I_{12}$, $I_{13}$, $I_{23}$ are currents of lines between the three MMC stations; $P_1$ is MMC1 output power; $V_2$ and $V_3$ are voltages of medium-voltage DC port of MMC1 and MMC2, and $P_{12}$, $P_{13}$, $P_{23}$ are transmission powers between the three MMC stations.

The MMC station 1 adopting the modular multilevel converter with multi-port DC power flow control is provided with two high-voltage DC ports, and power flow can be optimized with minimum line loss by adjusting outlet powers of the two ports. The power flow optimization results are shown in the following table. With the incorporation of the power flow controller, the power flow can be actively controlled to achieve power flow optimization.

| Line loss of original three-terminal DC transmission line | Line loss of three-terminal DC transmission line after power flow optimization | Reduction of line loss |
|---|---|---|
| 7.504 MW | 7.444 MW | 0.8% |

Embodiment 2

This embodiment is a solid state transformer based on the modular multilevel converter with multi-port DC power flow control described above, and is specifically implemented is as follows.

Figure 6:
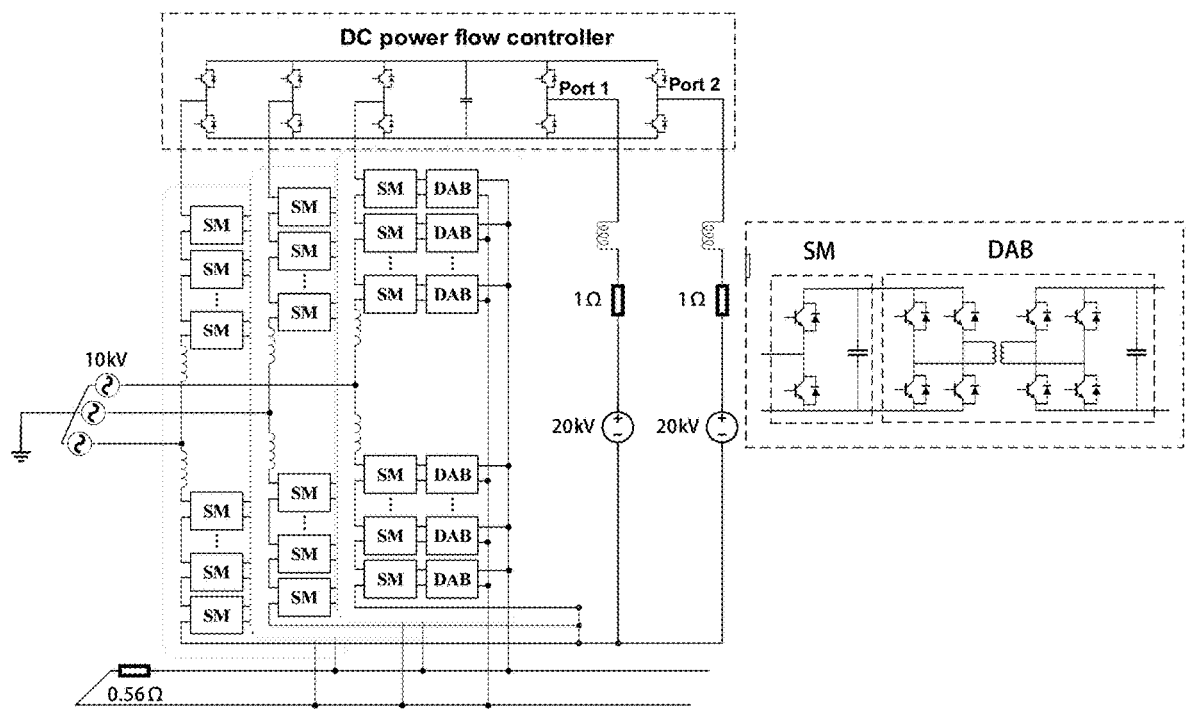
FIG. 6 is a schematic diagram showing the basic configuration of embodiment 2.

As shown in FIG. 6, a schematic diagram showing the basic configuration of an embodiment of a solid state transformer including the modular multilevel converter with multi-port DC power flow control of the present disclosure is illustrated, wherein: a DC power flow controller is connected to a solid state transformer based on a modular multilevel topology, and three-phase inputs of the DC power flow controller are connected in series to uppermost submodules of three-phase upper arms of the modular multilevel converter (MMC) topology, a three-phase bridge structure is adopted, energy is transferred between the input and the output via an additional capacitor, the output adopts half bridge type (two-quadrant) DC/DC converters, and the two half bridge type (two-quadrant) DC/DC converters are connected in parallel, thereby providing two flexible and controllable medium-voltage DC ports. In the solid state transformer, the submodules of the modular multilevel converter (MMC) topology and isolated dual active bridge converters (DAB) are interconnected, the submodules of the modular multilevel converter (MMC) topology are of two-level half bridge structure, and the input and the output of the dual active bridge converter (DAB) are both of two-level full-bridge structure, and a low-voltage DC bus is formed by connecting the outputs of a plurality of isolated dual active bridge converters (DAB) in parallel.

The topology of the DC power flow controller is shown in detail in FIG. 6, a three-phase half bridge is formed by parallel combination of half bridge submodules of three phases, and its AC port can output two-level three-phase alternating voltage, and the DC port outputs the voltage of the capacitor; the half bridge type (two-quadrant) DC/DC converter adjusts the output direct voltage by controlling on/off of switching transistors of the upper and lower arms. In the embodiment of the disclosure, the three-phase half bridge serves as the input of the DC power flow controller, and the half bridge type (two-quadrant) DC/DC converter serves as the output of the DC power flow controller.

Figure 7:
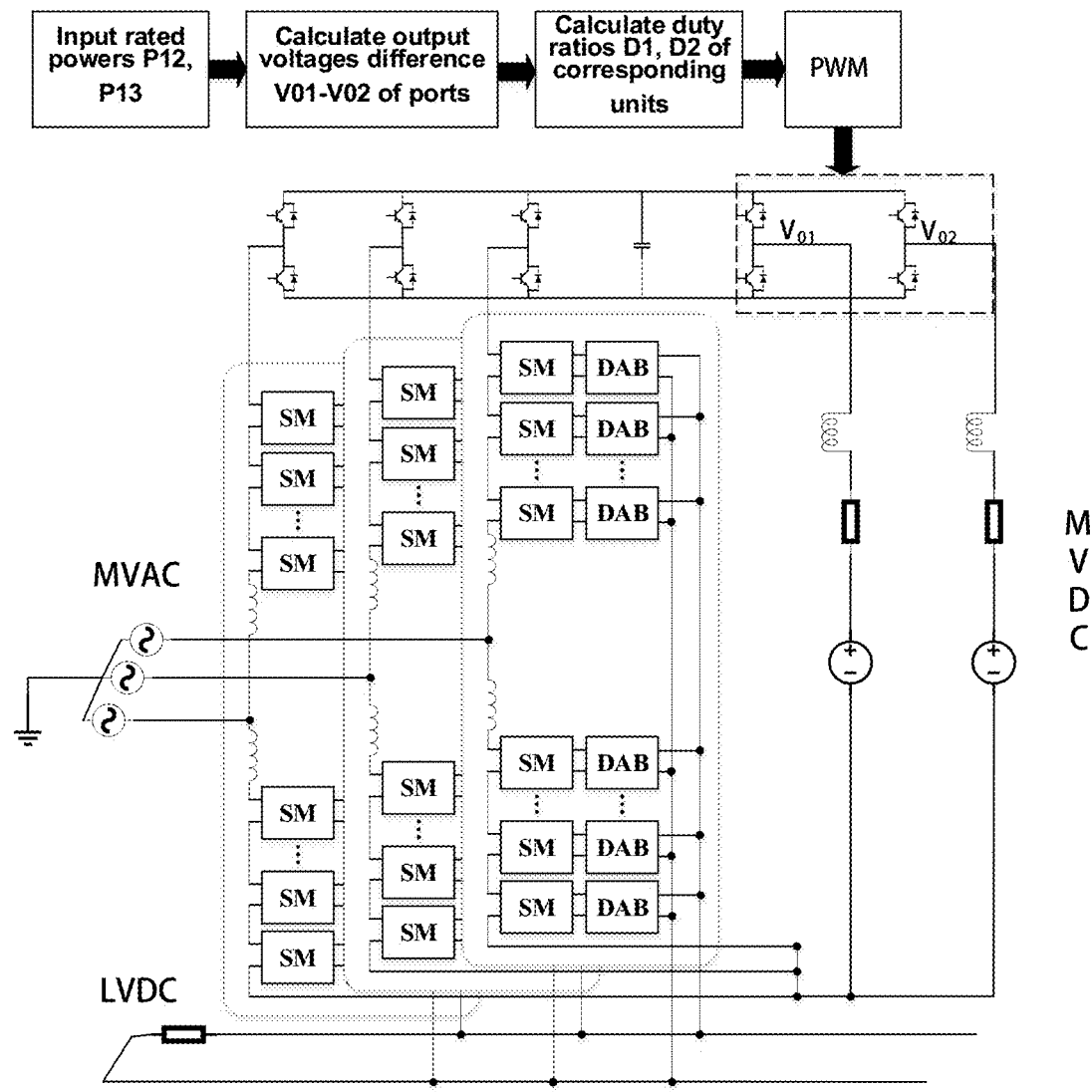
FIG. 7 is a block diagram showing a control strategy for the DC power flow controller according to embodiment 2.

In the embodiment 2, the AC port of the solid state transformer based on the modular multilevel converter with multi-port DC power flow control is connected to a medium-voltage AC power distribution network, the low-voltage DC port is connected to a low-voltage DC power distribution network, and the DC power flow controller enables the solid state transformer device to provide two medium-voltage DC ports which can be connected to a medium-voltage DC power distribution network. A block diagram illustrating a control strategy of the DC power flow controller is shown in FIG. 7, the difference between the output direct voltages of the two ports is calculated according to the rated output powers of the two medium-voltage DC ports, duty ratios of the two half bridge type (two-quadrant) DC/DC converters at the output is obtained according to the difference, and carrier phase shift modulation is performed.

In combination with the embodiment 2, open-loop simulation verification is performed on the MATLAB/Simulink software, a medium-voltage DC power supply and a load are connected to the medium-voltage DC ports in which the power supply is connected in series with the load, the medium-voltage AC power supply is connected to the medium-voltage AC port, the low-voltage DC port is connected with the load, and simulation parameters are shown in the following table.

| Parameter | Value | Parameter | Value |
|---|---|---|---|
| Rated alternating line voltage on medium-voltage side | 10 kV | Count of submodules of each arm of MMC | 12 |
| Rated direct voltage on low-voltage side | 750 V | Load of low-voltage DC side | 0.56Ω |
| DC side voltage of submodules of MMC | 1.67 kV | DC side capacitor voltage of power flow control module | 400 V |
| Rated power of medium-voltage DC port 1 | 0.3 MW | Rated power of medium-voltage DC port 2 | 0.7 MW |
| Voltage of DC power supply of medium-voltage DC port 1 | 20 kV | Voltage of DC power supply of medium-voltage DC port 2 | 20 kV |
| Load of medium-voltage DC port 1 | 1Ω | Load of medium-voltage DC port 2 | 1Ω |

In a simulation example, a solid state transformer based on the modular multilevel converter with multi-port DC power flow control is composed of a medium-voltage side MMC and a plurality of converters such as DABs as the middle stage, and the non-isolated multi-port DC power flow controller based on the modular multilevel topology is composed of a three-phase half bridge and a half bridge type (two-quadrant) DC/DC converter. Different converters need different modulation methods to ensure their steady-state operation. Carrier phase shift modulation is adopted for the medium-voltage side MMC, the three-phase half bridge and the half bridge type DC/DC converter; while square wave phase shift modulation is used for intermediate stage DABs.

With the simulation parameters, the theoretical results are as follows:
output power of the medium-voltage DC side port 1: 0.3 MW;
average direct voltage of the medium-voltage DC side port 1: 20 kV;
average DC of the medium-voltage DC side port 1: 15 A;
output power of the medium-voltage DC side port 2: 0.7 MW;
average direct voltage of the medium-voltage DC side port 2: 20 kV;
average DC of the medium-voltage DC side port 2: 35 A;
average capacitor voltage of the submodules of the MMC: 1.67 kV;
average DC side capacitor voltage of the DC power flow controller: 400V;
output power of low-voltage DC side: 1 MW;
average direct voltage of the low-voltage DC side: 750V;
average DC of the low-voltage DC side: 1331 A;

The simulation results in the figures are consistent with the theoretical calculation results, so that the steady-state power transmission and transformation functions among multiple AC and DC power distribution ports can be achieved through the modulation described above, and the output power of the medium-voltage DC ports can be flexibly controlled.

Figure 8:
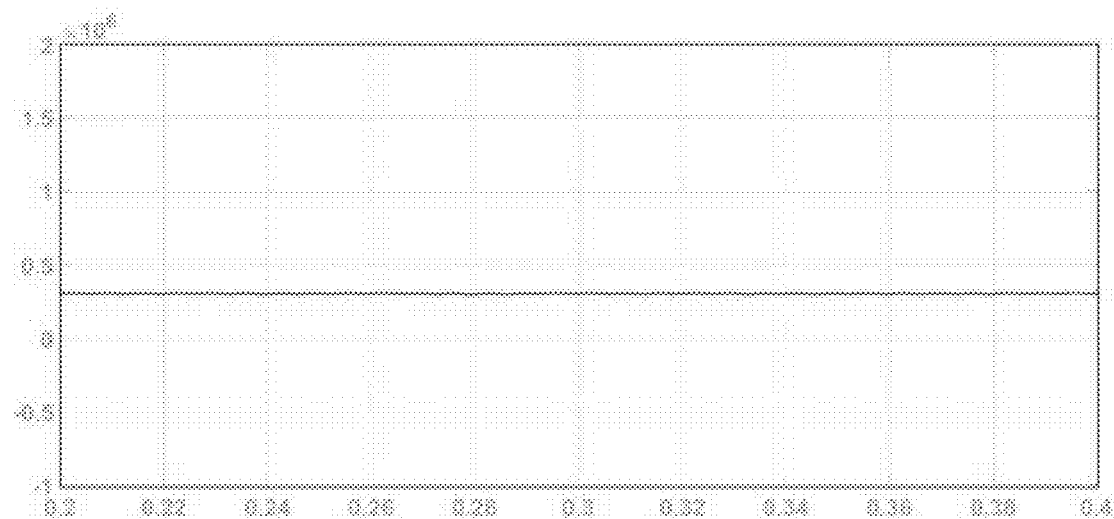
FIG. 8 shows the output power curve of the medium-voltage DC port 1 according to embodiment 2.

As shown in FIG. 8, an active power output curve of the medium-voltage DC port 1 in embodiment 2 is shown, wherein: the output active power curve of this port is stable around 0.3 MW in the steady state.

Figure 9:
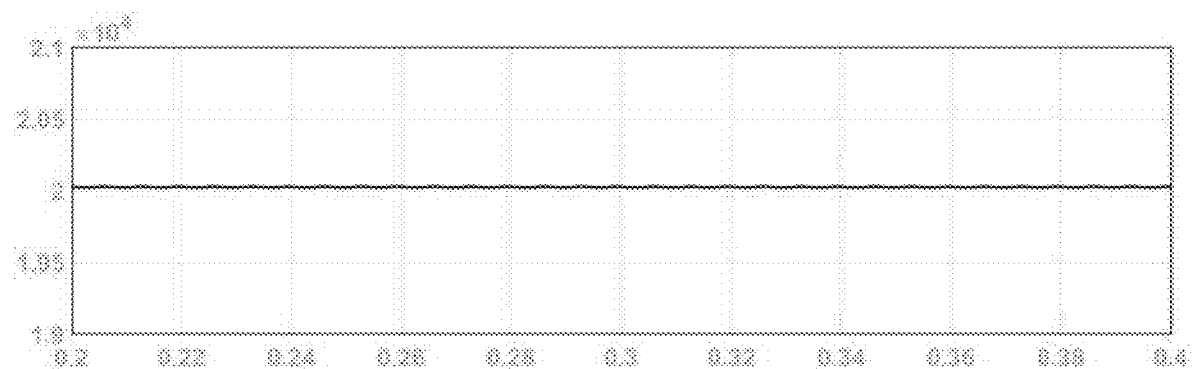
FIG. 9 shows the DC voltage curve of the medium voltage DC port 1 according to embodiment 2.

FIG. 9 is a DC voltage curve of the medium voltage DC port 1 in embodiment 2, wherein: the DC voltage of the port is stabilized at 20 kV in the steady state.

Figure 10:
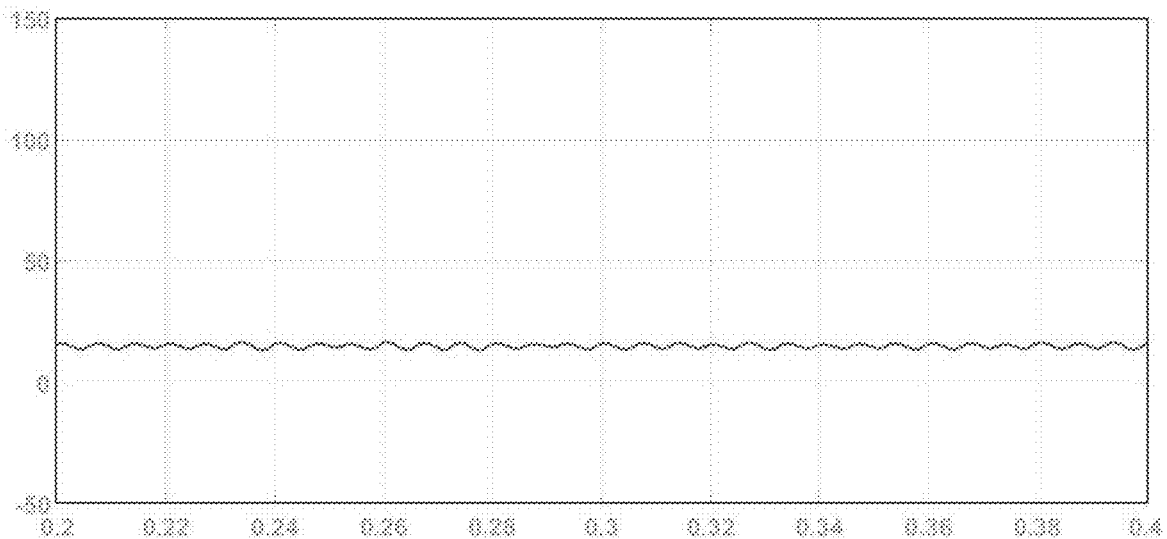
FIG. 10 shows the DC curve of the medium voltage DC port 1 according to embodiment 2.

FIG. 10 is a DC current curve of the medium-voltage DC port 1 in embodiment 2 of the present disclosure, wherein: the DC current of the port is stabilized around 15 A in the steady state.

Figure 11:
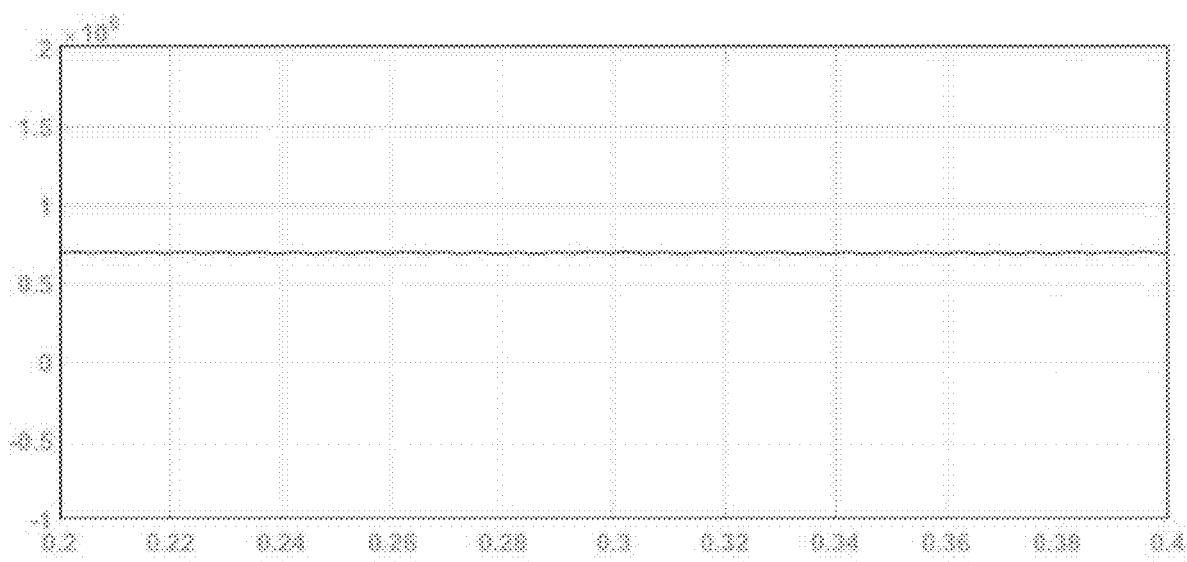
FIG. 11 shows the output power curve of the medium-voltage DC port 2 according to embodiment 2.

As shown in FIG. 11, an active power output curve of the medium-voltage DC port 2 in embodiment 2 is shown, wherein: the output active power of this port is stabilized around 0.7 MW in the steady state.

Figure 12:
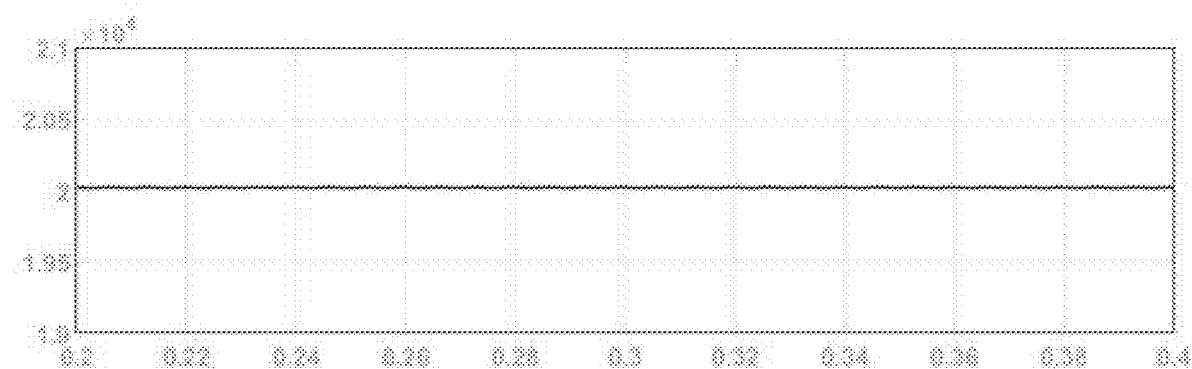
FIG. 12 shows the DC voltage curve of the medium voltage DC port 2 according to embodiment 2.

FIG. 12 is a DC voltage curve of the medium-voltage DC port 2 in embodiment 2, wherein: the DC voltage of the port is stabilized at 20 kV in the steady state.

Figure 13:
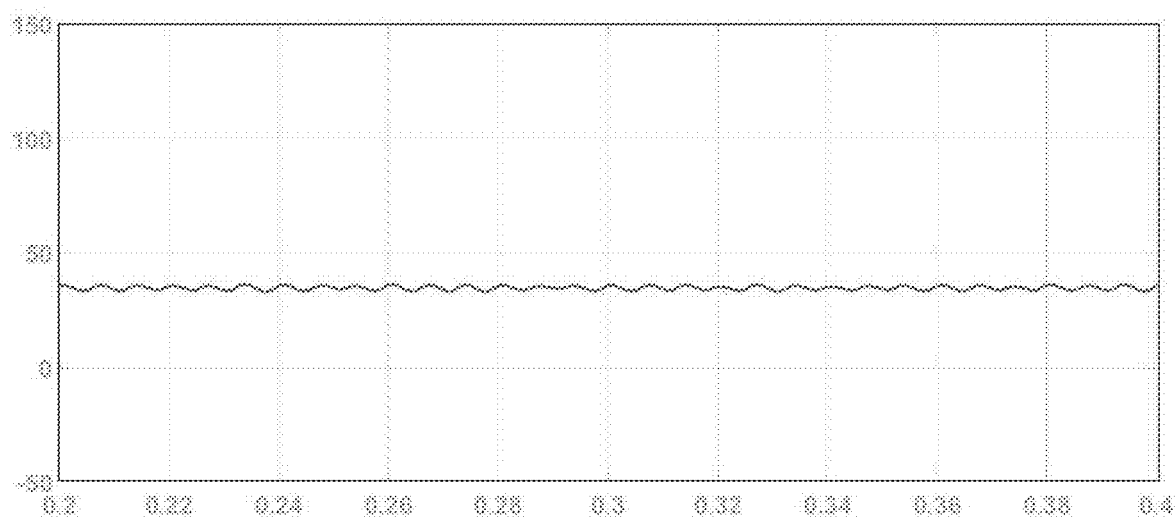
FIG. 13 shows the DC current curve of the medium voltage DC port 2 according to embodiment 2.

FIG. 13 is a DC current curve of the medium-voltage DC port 2 in embodiment 2 of the present disclosure, wherein: the DC current of the port is stabilized around 35 A in the steady state.

Figure 14:
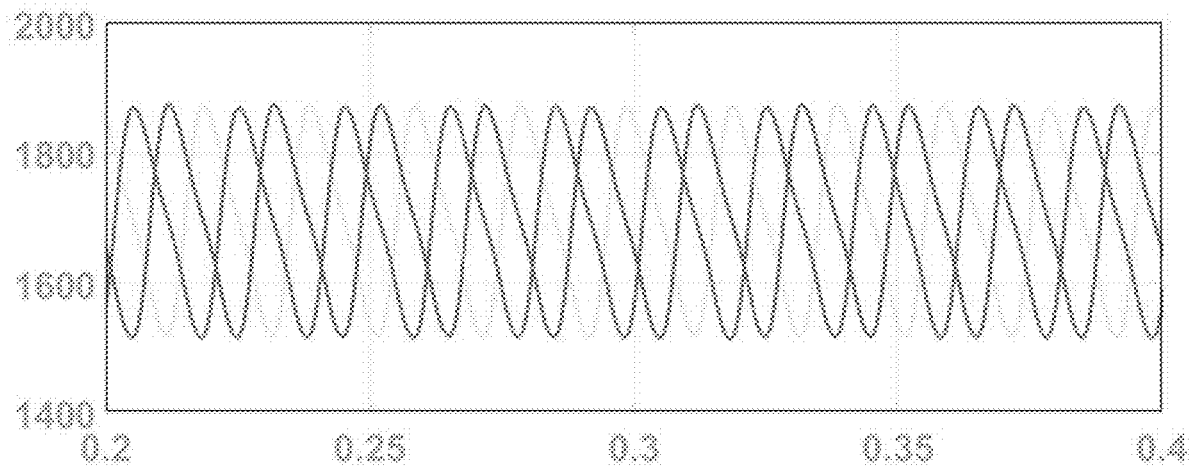
FIG. 14 shows the capacitor voltage curve of an MMC submodule according to embodiment 2.

FIG. 14 shows a capacitor voltage curve of the submodules of MMC in embodiment 2, wherein: the capacitor voltage of the submodules of the MMC fluctuates around an average value of 1.67 kV in the steady state.

Figure 15:
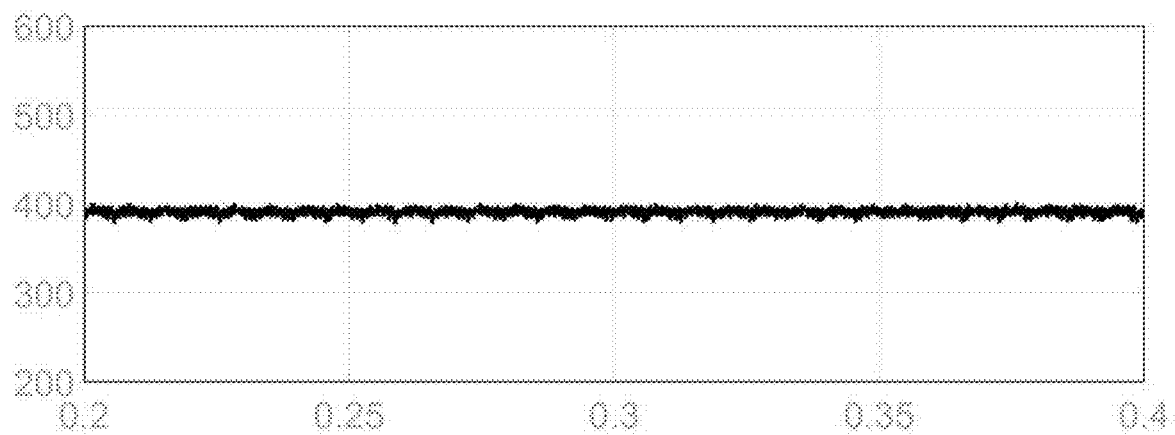
FIG. 15 shows the DC side capacitor voltage curve of the DC power flow controller according to embodiment 2.

FIG. 15 shows the DC side capacitor voltage curve of the DC power flow controller in embodiment 2, wherein: the DC side capacitor voltage of the power flow control module fluctuates around an average value of 400V in the steady state.

Figure 16:
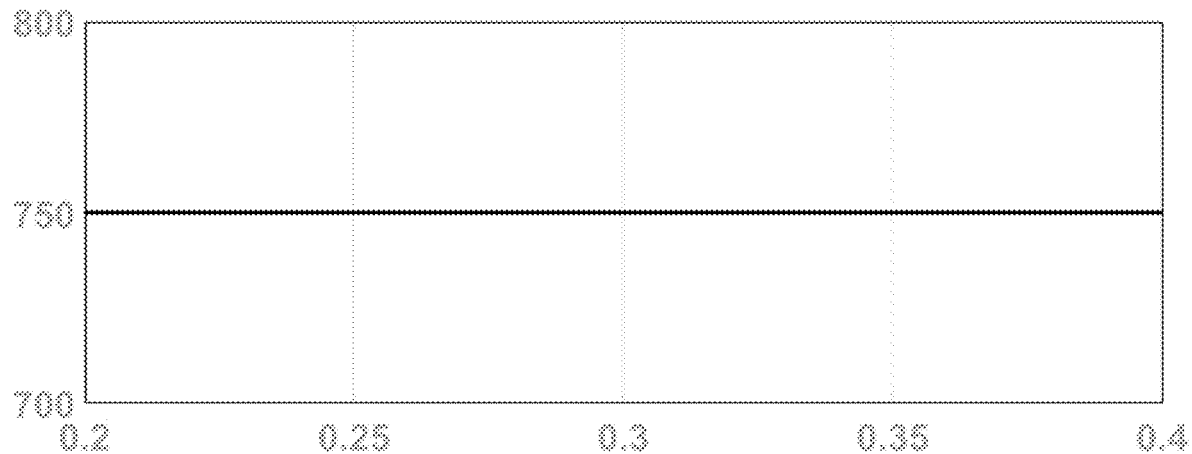
FIG. 16 shows the average voltage curve of the low-voltage DC side according to embodiment 2.

FIG. 16 shows an average voltage curve of a low-voltage side DC bus in embodiment 2 of the disclosure, wherein: the low voltage direct voltage is stabilized at 750V in the steady state.

Figure 17:
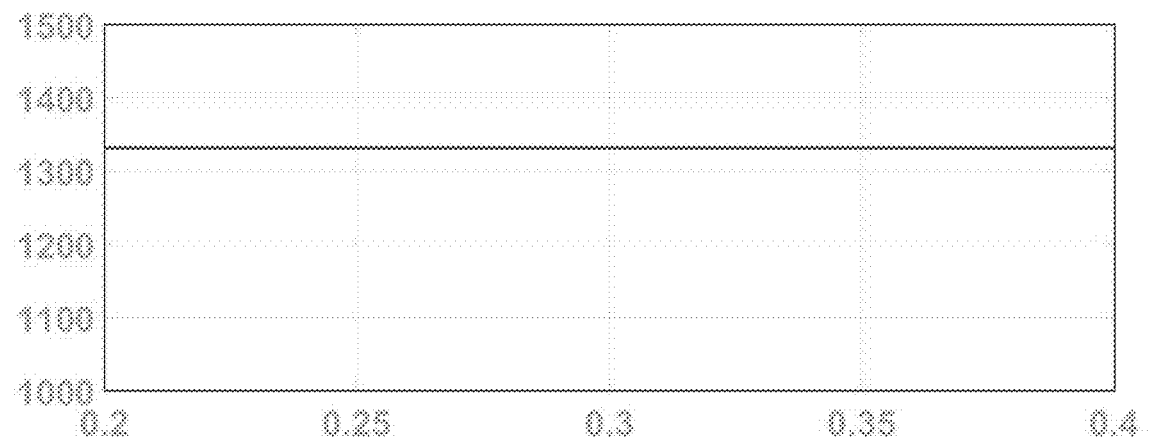
FIG. 17 shows the average current curve of the low-voltage DC side according to embodiment 2.

FIG. 17 shows an average current curve of the low-voltage side DC bus in embodiment 2 of the disclosure, wherein: the current of the low-DC bus is stabilized around 1331 A in the steady state, i.e. in this embodiment, the output active power transferred to the low-voltage DC side from the medium-voltage AC side is about 1 MW.

According to the embodiments described above, with the incorporation of the DC power flow controller, the solid state transformer based on the modular multilevel topological structure is provided with a plurality of medium-voltage DC ports, so that the control freedom degree of DC power flow is improved, and the effect of controlling the power flow of multiple lines is achieved; the DC power flow controller adopts less switching devices and lower loss; a low-frequency isolation transformer and an external power supply are eliminated; and the power can flow bidirectionally, and the power flow can be regulated in a wide range.

Specific embodiments of the disclosure have been described above. It is to be understood that the disclosure is not limited to the specific embodiments described above, and that various changes and modifications may be effected therein by those skilled in the art within the scope of the appended claims without departing from the spirit of the disclosure.

We claim:

1. A method for modulating a modular multilevel converter with multi-port DC power flow control, wherein the modular multilevel converter comprises a modular multilevel converter topology and a DC power flow controller, the modular multilevel converter topology composed of a plurality of upper and lower arms of identical configuration, each arm being formed by a plurality of cascaded submodules;

an input terminal of the DC power flow controller is connected in series to uppermost submodules of the upper arms of the modular multilevel converter topology, and with power transfer and energy interaction between the modular multilevel converter topology and an AC power grid, a converter station or a solid state transformer based on the modular multilevel converter topology has a function of DC power flow control;

a carrier phase shift modulation strategy is adopted for the DC power flow controller and the modular multilevel converter topology, and the input terminal of the DC power flow controller and the submodules of the modular multilevel topology take individual modulation strategies;

ignoring modification of the DC power flow controller and circulating current control of the arms of the modular multilevel converter topology and other balance control to a voltage reference of the arms, the following formulas are obtained:

$$\begin{cases} u_{ap0} = x_1 \frac{U_d}{2} - y_1 u_{aref} \\ u_{ap} = x_2 \frac{U_d}{2} - y_2 u_{aref} \\ u_{an} = \frac{U_d}{2} + u_{aref} \end{cases}$$

where $x_1$, $y_1$ are a DC component coefficient and a fundamental frequency AC component coefficient of the single-phase half bridge voltage reference of the DC power flow controller, respectively, $x_2$, $y_2$ are a DC component coefficient and a fundamental frequency AC component coefficient of the upper arms voltage reference of the modular multilevel converter topology, respectively, $u_{ap0}$ is an AC side output voltage reference of the single-phase half bridge, $u_{ap}$, $u_{an}$ are output voltage references of the upper and lower arms of the modular multilevel converter topology, respectively, $u_{aref}$ is an AC side output voltage reference of the modular multilevel converter topology, $u_{aref}=U \sin(\omega t)$, U is the amplitude of phase voltage of AC grid, $\omega$ signifies grid voltage angular frequency, t signifies time and $U_d$ is an DC bus voltage of the DC power flow controller;

the reference coefficients satisfy:

$$\begin{cases} x_1 + x_2 = 1 \\ y_1 + y_2 = 1 \\ x_1, x_2 > 0 \\ y_1, y_2 > 0 \end{cases}$$

where $U_{c0}$ is the DC component of the DC power flow controller capacitor voltage, $U_{c1}$ is the DC component of the submodule capacitor voltage, and n is the count of the submodules of each arm of the modular multilevel converter topology, so that average switching functions of the single-phase half bridge of the DC power flow controller and the submodules of the upper and lower arms of the modular multilevel converter topology are obtained as follows:

$$\begin{cases} F_{ap0}(t) = x_1 \frac{U_d}{2U_{c0}}(1 - m_1 \sin(\omega t)) \\ F_{ap}(t) = x_2 \frac{U_d}{2nU_{c1}}(1 - m_2 \sin(\omega t)) \\ F_{an}(t) = \frac{U_d}{2nU_{c1}}(1 + m \sin(\omega t)) \end{cases}$$

where $m_1$, $m_2$, m are voltage modulation coefficients of the single-phase half bridge of the DC power flow controller and the submodules of the upper and lower arms of the modular multilevel converter topology, respectively:

$$m_1 = \frac{y_1 U}{x_1 \frac{U_d}{2}}$$

$$m_2 = \frac{y_1 U}{x_1 \frac{U_d}{2}}$$

$$m = \frac{U}{\frac{U_d}{2}}$$

where U is the amplitude of an AC side phase voltage;

for a DC power flow controller with an input terminal of three-phase half bridge structure, the sum of input side currents at upper and lower terminals of the capacitor is the sum of DC components of the three-phase arms current of the modular multilevel converter topology, and assuming that the sum of the DC components of three-phase arms current of the modular multilevel converter topology connected to the DC power flow controller is $I_d$, then $$I_d = i_{SMp0-} + i_{SMp0+}$$

where $i_{SMp0-}$ is the input side current at the lower terminal of the capacitor of the DC power flow controller; $i_{SMp0+}$ is the input side current at the upper terminal of the capacitor of the DC power flow controller;

then, the currents of the upper and lower arms of the modular multilevel converter topology are as follows:

$$i_{ap}(t) = -\frac{1}{3}I_d - \frac{1}{2}i_a(t) = -\frac{1}{3}I_d - \frac{1}{2}I\sin(\omega t - \varphi)$$

$$i_{an}(t) = -\frac{1}{3}I_d + \frac{1}{2}i_a(t) = -\frac{1}{3}I_d + \frac{1}{2}I\sin(\omega t - \varphi)$$

where $i_a$ is an A-phase AC current; $\varphi$ is a power factor angle; $\omega$ is an alternating voltage frequency; t is time; I denotes the amplitude of phase current of AC grid; $i_{ap}(t)$ and $i_{an}(t)$ are A-phase upper and lower arms current of the modular multilevel converter topology, respectively;

the input side currents of the capacitor of the DC power flow controller are determined by multiplying the arm current of each phase by the switching function of the single-phase half bridge and then merging the three phases:

$$i_{SMp0-}(t) = \sum_{k=a,b,c} F_{kp0}(t) \cdot (-i_{kp}(t)) = -x_1 \frac{3U_d I}{8U_{c0}} m_1 \cos\varphi + x_1 \frac{U_d I_d}{2U_{c0}}$$

$$i_{SMp0+}(t) = \sum_{k=a,b,c} (1 - F_{kp0}(t))(-i_{kp}(t)) = I_d + x_1 \frac{3U_d I}{8U_{c0}} m_1 \cos\varphi - x_1 \frac{U_d I_d}{2U_{c0}}$$

where $F_{kp0}(t)$ is the average switching function of the single-phase half bridge of the DC power flow controller; $i_{kp}(t)$ is single-phase upper and lower arms current of the modular multilevel converter topology; and a, b and c are the three phases;

for a DC power flow controller with an input terminal of single-phase half bridge structure, the input side currents of the capacitor include a DC component as well as a low-frequency AC component, and assuming that the DC component of the single-phase arm current of the modular multilevel converter topology embedded with the DC power flow controller is $I_d$, then an upper arm current and a lower arm current of the modular multilevel converter are set as:

$$i_{ap}(t) = -I_d - \frac{1}{2}i_a(t) = -I_d - \frac{1}{2}I\sin(\omega t - \varphi)$$

$$i_{an}(t) = -I_d + \frac{1}{2}i_a(t) = -I_d + \frac{1}{2}I\sin(\omega t - \varphi)$$

the input side currents of the capacitor of the DC power flow controller are determined by multiplying the arm current of the phase and the switching function of the single-phase half bridge:

$$i_{SMp0-}(t) = F_{ap0}(t) \cdot (-i_{ap}(t)) = \frac{x_1 U_d I_d}{2U_{c0}}(1 - m_1\sin(\omega t)) +$$

$$\frac{x_1 U_d I}{4U_{c0}}\left(\sin(\omega t - \varphi) - \frac{1}{2}m_1(\cos\varphi - \cos(2\omega t - \varphi))\right)$$

$$i_{SMp0+}(t) = (1 - F_{ap0}(t))(-i_{ap}(t)) ==$$

$$I_d + \frac{1}{2}I\sin(\omega t - \varphi) - \frac{x_1 U_d I_d}{2U_{c0}}(1 - m_1\sin(\omega t)) -$$

$$\frac{x_1 U_d I}{4U_{c0}}\left(\sin(\omega t - \varphi) - \frac{1}{2}m_1(\cos\varphi - \cos(2\omega t - \varphi))\right)$$

an input and output power balance equation of the DC power flow controller is as follows:

$$P_{PFC} = U_d i_{SMp0+}(U_d - U_{c0})i_{SMp0-} = P_{MVDC}$$

where $P_{PFC}$ is an input active power of the DC power flow controller; $P_{MVDC}$ is an output active power of a medium-voltage DC side; and a, b and c are the three phases;

based on calculation and analysis, with appropriately selected DC component coefficients and fundamental frequency AC component coefficients of voltage reference, the voltage modulation coefficients of the single-phase half bridge of the DC power flow controller and the upper and lower arms of the modular multilevel converter topology are enabled to meet the energy balance of the DC power flow controller.

2. The method according to claim 1, wherein an open-loop control strategy is adopted for output DC ports of the DC power flow controller, and the following formulas are given $$\begin{cases} P_i = V_{oi} \cdot I_i \\ V_{oi} = I_i \cdot R_i + V_i \end{cases} i = 1, 2, \ldots n$$

Where $I_i$ signifies the average current of the DC line connected to the i DC port, $V_i$ signifies the average output voltage of the i DC port, $R_i$ signifies the resistance of the DC line connected to the i DC port, according to an output power reference $P_i$ of each DC port, an output voltage reference $V_{oi}$ of each DC port can be calculated, then, according to the specific topology of the output DC/DC converter, a relationship between the output voltage reference $V_{oi}$ and a duty ratio $D_i$ of the DC/DC converter is obtained, and in turn a relationship between the output voltages difference $\Delta V_{ij}$ and the duty ratios difference $\Delta D_{ij}$ is obtained:

$$V_{oi} = f(U_d, U_{c0}, D_i) \; i=1,2,\ldots n$$

$$\Delta V_{ij} = f(U_{c0}, \Delta D_{ij}) \; i,j=1,2,\ldots n, \; i \neq j$$

according to the features of the specific topology of the DC/DC converter, when the duty ratio of the converter of a certain DC port is selected, the duty ratios of all the DC ports are determined, and the transfer power reference value of the DC ports are satisfied through carrier phase shift modulation.

3. The method according to claim 1, wherein the DC power flow controller comprises an input terminal, a capacitor and an output terminal, wherein the capacitor is connected in parallel between the input terminal and the output terminal, and energy transfer between the input terminal and the output terminal is buffered by the capacitor.

4. The method according to claim 3, wherein the input terminal of the DC power flow controller takes a single-phase half bridge or three-phase half bridge structure.

5. The method according to claim 4, wherein three-phase input terminal of the DC power flow controller are connected in series to uppermost submodules of three-phase upper arms of the modular multilevel converter topology.

6. The method according to claim 5, wherein the capacitor is connected in parallel with the single-phase half bridge or three-phase half bridge structure, and the single-phase half bridge or three-phase half bridge structure enables the capacitor to be charged, discharged or bypassed by controlling the on/off of the upper and lower arms of the single-phase half bridge or three-phase half bridge structure, and as the DC power flow controller has no other energy storage device but the capacitor, the state of the single-phase half bridge or three-phase half bridge structure is controlled to keep balance of the voltage of the capacitor, i.e., energy balance between the input terminal and the output terminal of the DC power flow controller.

7. The method according to claim 1, wherein the output terminal of the DC power flow controller adopts DC/DC converters to regulate an output voltage, and a plurality of DC/DC converters are connected in parallel to form a plurality of flexible and controllable DC ports.

8. The method according to claim 7, wherein the output terminal of the DC power flow controller has a plurality of DC ports such that a converter station or a solid state transformer based on the modular multilevel converter topology provides a plurality of flexible and controllable DC ports, thereby allowing to construct a mesh/ring-type multi-terminal voltage source converter based DC transmission system based on a plurality of converter stations or mesh/ring-type multi-terminal voltage source converter based DC transmission system based on a plurality of solid state transformers.

9. A converter station comprising a modular multilevel converter with multi-port DC power flow control, wherein the modular multilevel converter with multi-port DC power flow control adopts the method according to claim 1.

10. A solid state transformer comprising a modular multilevel converter with multi-port DC power flow control, wherein the modular multilevel converter with multi-port DC power flow control adopts the method according to claim 1.

11. A mesh/ring-type multi-terminal voltage source converter based DC transmission system based on a plurality of converter stations, comprising the plurality of converter stations comprising a modular multilevel converter with multi-port DC power flow control, wherein the modular multilevel converter with multi-port DC power flow control adopts the method according to claim 1.

12. A mesh/ring-type multi-terminal voltage source converter based DC distribution system based on a plurality of solid state transformers, comprising the plurality of solid state transformers comprising a modular multilevel converter with multi-port DC power flow control, wherein the modular multilevel converter with multi-port DC power flow control adopts the method according to claim 1.

* * * * *